United States Patent Office 3,519,569
Patented July 7, 1970

3,519,569
ABRASIVE SCOURING CLEANSER
Ramon Bruno Diaz, Douglaston, N.Y., assignor to Colgate-Palmolive Company, New York, N.Y., a corporation of Delaware
No Drawing. Filed May 18, 1966, Ser. No. 550,923
Int. Cl. C11d 7/56
U.S. Cl. 252—99             8 Claims

ABSTRACT OF THE DISCLOSURE

An abrasive scouring cleanser containing as essential ingredients a water-insoluble inorganic siliceous abrasive material, a hypochlorite-chlorine liberating compound, a water-soluble organic detergent compound and from about 0.1 to about 10% by weight of an alkali metal bromide salt, the latter serving to suppress the evolution of volatile agents containing hypochlorite-generated osmophores.

---

This invention relates to abrasive scouring cleansers. More particularly, it relates to a means for improving the odor characteristics of abrasive scouring cleansers which contain a hypochlorite or a hypochlorite-liberating constituent.

It has previously been proposed to prepare abrasive scouring cleansers which contain a hypochlorite or a hypochlorite-liberating agent. On use, such scouring cleanser compositions tend to be characterized by the evolution of certain objectionable and unpleasant volatile agents containing osmophores associated with compositions containing hypochlorites. The odor of these agents also tends to be imparted to the skin, i.e., the hands of the persons using such scouring cleansers. In view of these considerations such compositions must be carefully formulated and perfumed in order to minimize or mask this characteristic. It is believed that this problem is especially acute in the case of abrasive scouring cleansers which contain such hypochlorites and hypochlorite precursors in combination with organic materials and a major proportion of a water-insoluble finely divided siliceous abrasive by virtue of the fact that any undesirable odoriferous products which develop on storage of these compositions tend to be sorbed by these compositions, in which a vast surface area is presented by the numerous finely divided particles of the composition, and to be displaced or released therefrom very rapidly and, therefore, in comparatively concentrated form when the composition is admixed with water at the time of its use.

It has now been discovered that the evolution of volatile agents containing hypochlorite-generated osmophores on use of certain scouring cleansers with water may be substantially inhibited by the inclusion in such compositions of a small amount of a water-soluble bromide salt. Thus, in accordance with the present invention, an abrasive scouring cleanser comprises at least about 60% by weight of a water-insoluble inorganic siliceous abrasive material having a particle size (diameter) of less than 0.5 mm., about 0.1 to 20% by weight of a dry water-soluble component which, on contact with water, liberates hypochlorite chlorine, about 0.5 to 15% by weight of a water-soluble organic detergent compound substantially stable in the presence of said hypochlorite-liberating component, and about 0.1 to 10% by weight of a water-soluble bromide salt.

The abrasive scouring cleansers of the instant invention are characterized by a pleasant odor which is relatively non-irritating, both on use with water and with respect to residual odor effects on the hands of users. These bromide-containing improved cleansers, by virtue of their minimization of volatile hypochlorite-generated osmophores, are comparatively more effectively perfumed by conventional essential oils and perfumery constituents. In addition, these improved compositions are highly stable on storage and efficacious on use, being characterized by very rapid and complete stain and soil removal and oxidizing action. They are also highly effective in polishing tarnished metal surfaces and in removal of smears or deposits of soft materials such as aluminum on porcelain surfaces.

The abrasive agents of the scouring cleansers of the present invention include siliceous materials such as silica, feldspar, pumice, vulcanic ash, diatomaceous earth, bentonite, and talc, and mixtures thereof. For general use, it is preferred to use either silica or feldspar of various degrees of fineness for they are relatively hard and result in a whiter product. The abrasives may vary in hardness, particle size and shape, and the choice for a particular composition is generally dependent upon the contemplated field of application. The particle size of the abrasive is less than 0.5 mm., and, in general, the maximum particle size of substantially all of the abrasive is about 0.15 mm. Normally the abrasive employed will have a particle size such that at least about 85% and preferably 99% by weight thereof passes through a sieve having 0.074 mm. openings. On the other hand, in the interest of effective cleansing action it is appropriate for at least about 8% by weight of the abrasive particles to have a diameter of about 0.037 mm. or larger. The abrasive is present in a proportion of at least about 60%, and preferably at least about 85 to 95% by weight of the cleanser.

Hypochlorite-generating components suitable for use in the compositions of the present invention are those water soluble dry solid materials which generate hypochlorite ion on contact with, or dissolution in, water. Examples thereof are the dry, particulate heterocyclic N-chlorimides such as trichlorocyanuric acid, dichlorocyanuric acid and salts thereof such as sodium dichlorocyanurate and potassium dichlorocyanurate. Other N-chlor imides may also be used such as N-chlorosuccinimide, N-chloromalonimide, N-chlorophthalimide and N-chloronaphthalimide. Additional suitable N-chlor imides are the hydantoins such as 1,3-dichloro-5,5-dimethylhydantoin;
N-monochloro-C,C-dimethylhydantoin;
methylene-bis (N-chloro-C,C-dimethylhydantoin);
1,3-dichloro-5-methyl-5-isobutylhydantoin;
1,3-dichloro-5-methyl-5-ethyldantoin;
1,3-dichloro-5,5-diisobutylhydantoin;
1,3-dichloro-5-methyl-5-n-amylhydantoin;

and the like. Other useful hypochlorite-liberating agents are trichloromelamine and dry, particulate, water soluble anhydrous inorganic salts such as lithium hypochlorite. The hypochlorite-liberating agent may, if desired, be a stable, solid complex or hydrate such as sodium p-toluene - sulfo - chloramine - trihydrate, sodium benzene-sulfo-chloramine-dihydrate, calcium hypochlorite tetrahydrate, or chlorinated trisodium phosphate containing 0.5 to 4% available chlorine produced by combining trisodium phosphate in its normal $Na_3PO_4 \cdot 12H_2O$ form and an alkali metal hypochlorite (e.g., sodium hypochlorite) in accordance with known procedures such as those set forth in Mathias U.S. Pat. No. 1,555,474 and Adler U.S. Pat. No. 1,965,304, and the like. In addition to the foregoing components, the hypochlorite-generating agent may constitute a combination of materials such as a mixture of an alkali metal monopersulfate salt and an alkali metal chloride, typically in a ratio of chloride salt to monopersulfate salt within the range of about 0.1:1 to about 40:1 respectively, e.g., a mixture of about 3½ parts by weight of sodium chloride per part of potassium monopersulfate.

Normally the instant chlorine-liberating agents are employed in a proportion of about 0.1 to 20% by weight of the composition, and preferably about 0.2 to 15%. Desirably the proportion thereof employed will be such as to yield a product which contains from about 0.2% to about 1% available chlorine on a total weight basis, although other proportions may be employed as desired.

The third essential ingredient of the present novel abrasive cleansers is a water soluble organic detergent which is stable in the presence of the contemplated hypochlorite-liberating component. These organic detergents may be anionic, cationic, amphoteric or non-ionic in character, provided that they are compatible with the compositions as a whole in the proportions employed. Where they are liquids under normal conditions, such as the non-ionic agents generally, they may be prepared in particulate solid form after adsorption upon diatomaceous earth or other similar agents in procedures well known in the art.

As examples of suitable anionic detersive compounds contemplated within the ambit of the invention are the soaps and the sulfated and sulfonated synthetic detergents, especially those anionic detergents having about 8 to about 26 and preferably about 12 to about 22 carbon atoms to the molecule. The soaps are generally the water soluble salts of saturated higher fatty acids and mixtures thereof.

The sulfated and sulfonated detersive compounds are also well known in the art and may be prepared from suitable organic materials which are applicable to sulfonation ("true sulfonation and/or sulfation"). Of the vast variety of sulfates and sulfonates suitable, it is preferred to use the aliphatic sulfates and sulfonates of about 8 to 22 carbon atoms and the alkyl aromatic sulfonates.

The alkyl aromatic sulfonate detergents referred to may be mononuclear or polynuclear in structure. More particularly, the aromatic nucleus may be derived from benzene, toluene, xylene, phenol, cresols, phenol ethers, naphthalene, derivatives of phenanthrene nuclei, etc. It has also been found that the alkyl group may vary similarly. Thus, for example, the alkyl groups may be straight or branch chained and may consist of such radicals as dodecyl, pentadecyl, octyl, nonyl, decyl, keryl, mixed alkyls derived from fatty materials, cracked paraffin wax olefins, and polymers of lower mono olefins, etc. While the number of sulfonic acid groups present on the nucleus may vary, it is usual to have only one such group present in order to preserve as much as possible a balance between hydrophilic and hydrophobic portions of the molecule.

More specific examples of suitable alkyl aromatic sulfonate detergents are the propylated naphthalene sulfonates, the mixed butyl naphthalene sulfonates, tetrahydronaphthalene sulfonates, the various butylated diphenyl sulfonates and phenylphenol sulfonates. it is preferred, however, to use the higher alkyl aromatic sulfonates rather than the lower alkyl substituted detergents. Typical examples of this preferred class are the sulfonated and alkylated benzene type compounds wherein the alkyl group is at least 8 and preferably about 10 to about 16 carbon atoms. The benzene ring may possess other substituents including alkyl and hydroxy groups.

Other suitable agents are the surface-active sulfated or sulfonated aliphatic compounds, preferably having 8–22 carbon atoms. Within the scope of such definition are the sulfuric acid esters of polyhydric alcohols incompletely esterified with higher fatty acids, e.g., coconut oil monoglyceride monosulfate, tallow diglyceride monosulfate; the long chain pure or mixed alkyl sulfates, e.g., lauryl sulfate, cetyl sulfate; the hydroxy sulfonated higher fatty acid esters, e.g., higher fatty acid esters of low molecular weight alkylol sulfonic acids, e.g., fatty acid esters of isethionic acid; the fatty acid ethanolamide sulfates; the fatty acid amides of amino alkyl sulfonic acids, e.g., lauric amide of taurine, and the like. More particularly, it is preferred to use the sulfated aliphatic compounds containing at least about 8 carbon atoms, especially those having 12 to about 22 carbon atoms to the molecule.

Although the anionic detergents are preferred, cationic, non-ionic and amphoteric detergents may be also employed in whole or as part of the detergent component, provided they are compatible with the other elements of the composition under conditions of storage and use thereof. As cationic detergents there may be noted the long chain alkyl quaternary ammonium compounds, e.g., cetyl quaternary ammonium salts. Within this group are included cetyl tri-methyl ammonium chloride and cetyl pyridinium chloride. Another equivalent cationic agent is the diethylene amino ethyl oleyl amide product.

The non-ionic agents are also well known in the art including the polyoxyethylene ethers of alkyl aromatic hydroxy bodies (e.g., the alkylated polyoxyethylene phenols), the polyoxyethylene ethers of long chain aliphatic alcohols, the polyoxyethylene ethers of hydrophobic propylene oxide polymers, and higher alkyl amine oxides such as lauryl dimethyl amine oxide. Amphoteric detergents which also are contemplated, examples thereof including the salts of higher alkyl beta amino propionic acids, e.g., sodium N-lauryl beta alanine; the higher alkyl substituted betaines such as lauryl dimethylammonium acetic acid; and the imidazoline type exemplified by the disodium salt of 1-(2-hydroxyethyl)-1-(carboxymethyl)-2-(hendecyl)-4,5-dihydroimidazolinium hydroxide.

The anionic and cationic surface active agents are commonly used in the form of their water soluble salts. For the synthetic anionic compounds, the alkali metal (e.g. sodium, potassium) salts are preferred, though other salts such as ammonium, amine, alkylolamine, and alkaline earth metals (e.g. calcium, magnesium) salts may be used if desired. For the cationic agents the chloride, sulfate, acetate, and like salts may be employed satisfactorily.

The amount of organic detergent to be used in the present compositions is from about 0.5% up to about 15% by weight, and preferably from about 1% to about 5%. Commercial detergent compositions in which these organic detergents are the active ingredients and are compounded with other materials including sodium sulfate, the various phosphates, etc. may be employed with satisfactory results.

The bromide salt of the instant compositions is a solid, water soluble bromide which preferably is of substantially neutral or slightly alkaline nature, providing a ready source of bromide ions on dissolution in water. It is preferred to employ alkali metal bromides such as sodium bromide, sodium bromide dihydrate, lithium bromide, and potassium bromide, although alkaline earth metal bromides such as strontium bromide and magnesium bromide may also be employed in those instances in which these water hardness-producing cations are not objectionable. The preferred bromides are anhydrous, although any suitable combination in which the hypochlorite-liberating component and bromide salt do not yield water of hydration to each other may be employed, thereby insuring that the hypochlorite component maintains its original degree of hydration and stability in the composition. Preferably, the bromide is employed in an amount which is equal to or somewhat greater than the molar equivalent of latent hypochlorite-chlorine which is present in the product, e.g., the mole ratio of water soluble bromide bromine to latent hypochlorite chlorine is preferably on the order of about 1:1 to about 1.5:1, and suitably in a proportion of about 0.1% to 10% by weight of the product.

Suitable various adjuvant materials may also be used in the instant abrasive detersive compositions. These additives may be inorganic or organic in structure and may be included in compositions of the present invention. Inorganic water soluble alkaline builders such as the alkali metal silicates, nitrates, chlorides, carbonates, bicarbonates, phosphates and borates may be added in any suitable amounts, usually up to about 25% and preferably up to about 15%. Examples of such builders include sodium carbonate, sodium bicarbonate, sodium metasilicate, trisodium phosphate, tetrasodium pyrophosphate, sodium tripolyphosphate, and the corresponding potassium salts. Similarly, there may be employed minor amounts of sequestering agents such as nitrilotriacetic acid, ethylene diamine tetraacetic acid, wood pulp, sawdust, magnesite, whiting, sodium carboxymethylcellulose, anti-caking agents, optical brighteners, and the like. These constituents as well as all of the other constituents of the instant cleansers, desirably are of the same fine particle size as the abrasive constituent, and suitably may be ground in an attrition mill if necessary in order to insure the preparation of a uniform product of smooth appearance.

The following examples are illustrative of the present invention and it will be understood that the invention is not limited thereto. All of the solid constituents employed in the compositions of these examples have a maximum particle diameter of less than 0.5 mm., and at least 8% by weight of the abrasive, e.g. silica and feldspar, particles have a diameter in the range of 0.037–0.15 mm. In these examples, and elsewhere throughout the specification and claims, all proportions and ratios are by weight unless otherwise specified.

EXAMPLE I

A base preparation is prepared which contains:

| | Parts by weight |
|---|---|
| Silica (at least 88% by weight passes through a wire sieve in which the openings between the wires are 0.074 mm.) | 89.8 |
| Trichlorocyanuric acid | 0.3 |
| Sodium dodecylbenzene sulfonate | 3.7 |
| Sodium sulfate | 2.3 |
| Sodium silicate | 0.7 |
| Trisodium phosphate | 3.0 |
| Perfume | 0.2 |

Sodium bromide is admixed with the base preparation in varying amounts, to wit, 0.3, 3.0 and 6.0 parts per 100 parts of base preparation. Each of the three final compositions is an excellent scouring cleanser and is substantially devoid of objectionable release of hypochlorite-generated osmophores on use with water. The scouring cleanser composition containing 3.0 parts of sodium bromide per 100 parts of base preparation is somewhat preferred in that it appears to be characterized by more rapid stain removing ability than the other two embodiments.

EXAMPLE II

| | Parts by weight |
|---|---|
| Silica (at least 99% by weight passes through a wire sieve in which the openings between the wires are 0.074 mm.) | 89.8 |
| Trichlorocyanuric acid | 0.2 |
| Sodium dodecylbenzene sulfonate | 4.0 |
| Sodium sulfate | 2.3 |
| Sodium silicate | 0.7 |
| Trisodium phosphate | 3.0 |

EXAMPLE III

Sodium bromide is admixed with the base preparation in varying amounts, to wit, 0.3, 0.7, 1.2, 1.8, 3.0 and 4.0 parts per 100 parts of base preparation. Each of the six final compositions is an excellent scouring cleanser and, on use with water, is substantially devoid of any objectionable release of volatile materials containing hypochlorite-generated osmophores. The compositions containing 3.0 and 4.0 parts of sodium bromide per 100 parts of base preparation are somewhat preferred in that they appear to be characterized by more rapid stain removing ability than the other four embodiments illustrated.

| | Parts by weight |
|---|---|
| Silica of Example I | 86.0 |
| Sodium dodecylbenzene sulfonate | 4.0 |
| Sodium sulfate | 2.3 |
| Sodium silicate | 0.7 |
| Potassium monopersulfate | 1.0 |
| Sodium chloride | 3.0 |
| Sodium bromide | 3.0 |

EXAMPLE IV

| | |
|---|---|
| Silica of Example I | 74.0 |
| Sodium dodecylbenzene sulfonate | 3.5 |
| Sodium sulfate | 3.1 |
| Pentasodium tripolyphosphate | 5.5 |
| Sodium silicate | 1.5 |
| 1,3-dichloro-5,5-dimethyl hydantoin | 6.4 |
| Sodium bromide | 6.0 |

EXAMPLE V

| | |
|---|---|
| Feldspar (at least 99% by weight passes through a wire sieve in which the openings between the wires are 0.074 mm.) | 85.0 |
| Trisodium phosphate | 0.4 |
| Sodium chloride | 0.1 |
| Sodium carbonate | 0.6 |
| Sodium soap (mixed tallow and coconut oil soaps in 50–50 proportion) | 3.2 |
| N-chloro-succinimide | 5.0 |
| Sodium bromide | 5.7 |

EXAMPLE VI

| | |
|---|---|
| Silica of Example I | 85.92 |
| Sodium lauryl sulfate | 3.55 |
| Sodium sulfate | 2.2 |
| Pentasodium tripolyphosphate | 3.7 |
| Sodium silicate | 1.1 |
| Dichlorocyanuric acid | 0.25 |
| Sodium bromide | 3.00 |
| Melamine | 0.20 |
| Perfume | 0.08 |

In this example the dichlorocyanuric acid may be replaced by an equal weight of potassium dichlorocyanurate.

EXAMPLE VII

| | Parts by weight |
|---|---|
| Silica of Example I | 80.20 |
| Sodium tridecylbenzene sulfate | 2.90 |
| Sodium sulfate | 1.50 |
| Sodium silicate | .40 |
| Chlorinated trisodium phosphate (3.4% of available chlorine) | 7.50 |
| Potassium bromide | 7.50 |

EXAMPLE VIII

| | |
|---|---|
| Silica of Example II | 88.2 |
| Trichlorocyanuric acid | 0.5 |
| Sodium dodecylbenzene sulfonate | 3.7 |
| Sodium sulfate | 2.5 |
| Sodium silicate | 0.4 |
| Sodium bromide | 0.7 |
| Trisodium phosphate | 4.0 |

What is claimed is:

1. An abrasive scouring cleanser consisting essentially of at least about 60% by weight of a water-insoluble inorganic siliceous abrasive material having a particle size of less than about 0.5 mm., about 0.1 to 20% by weight of a dry water-soluble component which, on contact with water, liberates hypochlorite chlorine, about 0.5 to 15% by weight of a water-soluble organic detergent compound substantially stable in the presence of said hypochlorite-chlorine liberating agent and about 0.1 to 10% by weight of an alkali metal bromide salt.

2. An abrasive scouring cleanser as set forth in claim 1 which contains, as the hypochlorite-liberating component, a material selected from the group consisting of trichlorocyanuric acid, dichlorocyanuric acid, and an alkali metal salt of dichlorocyanuric acid.

3. An abrasive souring cleanser as set forth in claim 1 wherein substantially all of said water-insoluble inorganic siliceous abrasive material has a particle size of less than about 0.15 mm. and such that at least 85% by weight thereof passes through a sieve having 0.074 mm. openings, said hypochlorite chlorine-liberating compound is present in amounts of about 0.2 to 15% by weight and said organic detergent comprises a water-soluble anionic detergent compound substantially stable in the presence of said hypochlorite-chlorine liberating component, said anionic detergent being present in amounts ranging from about 1 to 5% by weight and 0.1 to 10% by weight of an alkali metal bromide.

4. An abrasive scouring cleanser as set forth in claim 1 wherein said inorganic siliceous material is present in amounts of 88.2% by weight, said hypochlorite-chlorine liberating compound is trichlorocyanuric acid, said organic detergent is sodium dodecyl benzene sulfonate, said alkali metal bromide is sodium bromide, said composition further containing about 2.5% of sodium sulfate about 0.4% of sodium silicate and about 4.0% of trisodium phosphate.

5. An abrasive scouring cleanser as set forth in claim 1 which contains at least 85% by weight of silica as the inorganic siliceous abrasive material.

6. An abrasive scouring cleanser as set forth in claim 1 in which the hypochlorite-liberating component is chlorinated trisodium phosphate.

7. An abrasive scouring cleanser as set forth in claim 1 in which the alkali metal bromide is sodium bromide.

8. An abrasive scouring cleanser as set forth in claim 3 in which the mole ratio of water soluble bromine present as metal bromide to chlorine present at latent hypochlorite is on the order of about 1:1 to 1.5:1 by weight respectively.

References Cited

UNITED STATES PATENTS 2,815,311　12/1957　Ellis et al. _____ 252—186 XR
3,359,207　12/1967　Kaneko et al. _____ 252—99

FOREIGN PATENTS 208,587　6/1957　Australia.
832,105　4/1960　Great Britain.

MAYER WEINBLATT, Primary Examiner

U.S. Cl. X.R.

8—108; 252—95, 103, 187